March 1, 1955     L. C. NEUFELD     2,703,259
NOZZLE STRUCTURE FOR WINDSHIELD CLEANING DEVICES
Filed Sept. 2, 1952
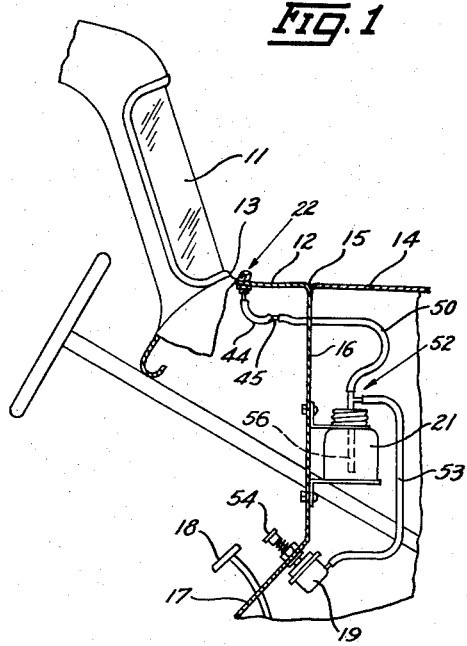
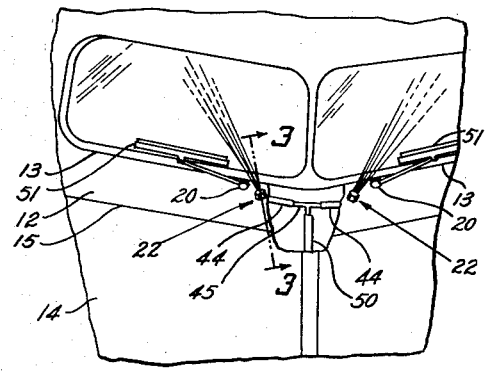
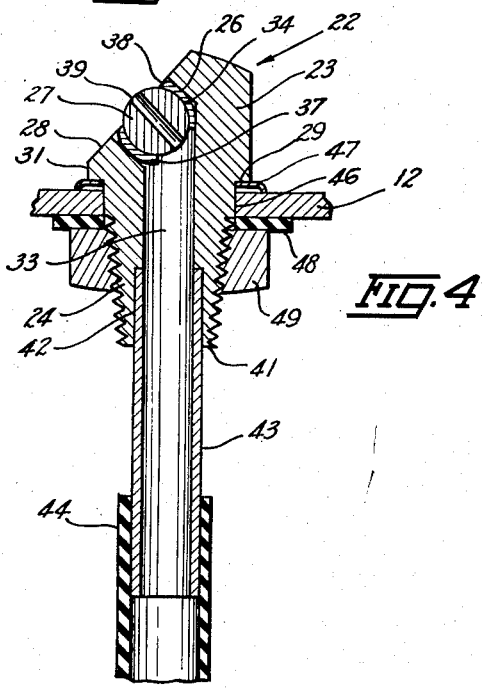
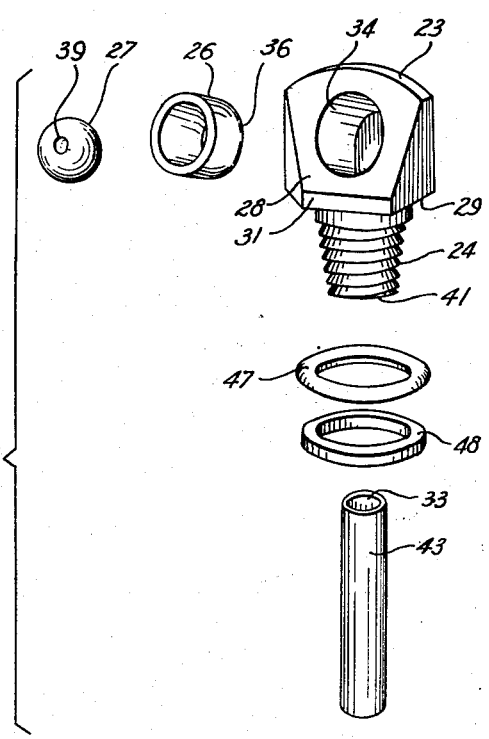
INVENTOR.
LEONARD C. NEUFELD
BY
ATTORNEY.

United States Patent Office 2,703,259
Patented Mar. 1, 1955

2,703,259

NOZZLE STRUCTURE FOR WINDSHIELD CLEANING DEVICES

Leonard C. Neufeld, Des Moines, Iowa, assignor to The Delman Company, Des Moines, Iowa, a partnership Application September 2, 1952, Serial No. 307,509

2 Claims. (Cl. 299—73)

This invention relates generally to automobile windshield clearing systems and more particularly to a nozzle unit in such a system for directing a stream of fluid onto the windshield.

An object of this invention is to provide an improved nozzle unit.

A further object of this invention is to provide a nozzle unit for an automobile windshield clearing system adapted to be mounted on the automobile engine cowl, and having an adjustable discharge ball member for directing a jet of fluid into the path of travel of the usual windshield wiper.

Another object of this invention is to provide a nozzle unit which is of a compact and rugged construction, economical to manufacture, efficient in operation and readily maintained in any adjusted position.

Further objects, features and advantages of this invention will appear from the following description when taken in connection with the accompanying drawings, in which:

Fig. 1 is a fragmentary foreshortened longitudinal sectional view of an automobile showing a windshield clearing system, embodying the nozzle unit of this invention;

Fig. 2 is a fragmentary perspective view of an automobile showing the nozzle unit installed on the automobile engine cowl, with parts being broken away for the purpose of clarity;

Fig. 3 is an enlarged longitudinal sectional view of the nozzle unit as seen along the line 3—3 in Fig. 2; and Fig. 4 is an exploded perspective view of the nozzle unit.

With reference to the drawings, there is illustrated in Fig. 1 a windshield clearing system as applied to an automobile having a two part windshield 11, an engine cowl 12 extended forwardly from the lower front edge 13 of the windshield 11, and an engine hood 14 positioned forwardly of the front end 15 of the cowl 12. The automobile is further equipped with the usual fire wall 16 and an upwardly and forwardly inclined floorboard section 17 which joints with the lower end of the fire wall 16.

The windshield clearing system includes a pump unit 19 supported on the underside of the floorboard section 17 adjacent the automobile clutch pedal 18 and a fluid reservoir or container 21 supported on the front side of the fire wall 16. The fluid reservoir 21 carries fluid for a pair of identical nozzle or fluid discharge units 22 secured to the engine cowl 12 at positions adjacent the windshield wiper shafts 20.

Each nozzle unit 22 (Figs. 3 and 4) consists of a head member 23 formed with a downwardly projected externally threaded extension or shank 24. As best appears in Fig. 4, the member 23 is generally hexagonal in shape, with one side 31 thereof cut away to form an upwardly and forwardly inclined surface 28 to be hereinafter referred to as the rear face of the head member 23. The junction of the head member 23 and the shank 24 is defined by a horizontal shoulder 29, with the lower edge of the rear face 28 being space upwardly from the shoulder 29. The shank 24 extends downwardly from the shoulder 29 and is tapered so as to be of a smaller diameter at its lower end 41 than at its junction with the shoulder 29.

An axially extended bore 33 is formed in the shank 24 and extended into the head member 23 so as to terminate at its upper end in a generally upwardly and laterally directed enlarged section 34. At its bottom end the bore 33 is formed with an enlarged section or cavity 42 into which is pressed a tubular fluid carrying member 43. The inner diameter of the fluid carrying member 43 corresponds to the diameter of the bore 33 so that together the member 43 and the bore 33 form a continuous fluid passage communicating at its upper end with the enlarged bore section 34.

Pressed into the bore section 34 is a tubular sleeve member 26. Within the tubular member 26 is a jet ball member 27 of a diameter to be frictionally engaged with the inner peripheral surface of the tubular member 26. The ball member 27 is formed with an axially extended fluid passage or discharge orifice 39 positioned so as to be in fluid communication with the bore 33. The inner end 36 of the tubular member 26 is formed with an inwardly extended seat or stop portion 37 for limiting the insertion of the ball member 27 therein to a position defined by its engagement with the seat 37 (Fig. 3).

The seat 37 is formed in the tubular member 26 a distance from the outer end 38 thereof less than the diameter but greater than the radius of the ball member 27 so that one end of the ball member 27 projects slightly beyond the outer end 38, which is swaged or deformed into frictional engagement with the ball member 27 to retain the same within the tubular member 26. The tubular member 26 is of a length such that when positioned within the enlarged section 34, a portion of the inner end 36 thereof engages the junction of the enlarged bore section 34 and the bore 33, while the outer end 38 of the tubular member 26 is flush with the rear face 28 of the head member 23.

It is seen, therefore, that the tubular member 26 is pressed into the enlarged bore section 34 and the ball member 27 is held in the tubular member 26 by its frictional engagement with the swaged end 38 of the member 26 and the seat 37, so as to be adjustable in the member 26.

In the assembly of a nozzle unit 22 on the engine cowl 12 of the automobile, an opening 46 is formed in the cowl 12 adjacent one of the windshield wiper shafts 20. A supporting ring 47 is first positioned about the extension 24 against the horizontal shoulder 29 on the head member 23, after which the threaded extension 24 is inserted through the cowl opening 46 (Fig. 3). A resilient washer 48 is then placed on the extension 24 so as to contact the bottom side of the cowl 12, and a nut 49 is threaded on the extension 24 to clamp the head member 23 against the cowl 12. Concurrently with the tightening of the nut 49 the head member 23 is positioned on the cowl 12 so that a stream of fluid discharged from the discharge orifice 39 is directed against a corresponding part of the windshield 11 into the path of a usual windshield wiper 51.

When both of the nozzle units 22 have been thus assembled on the engine cowl 12 (Fig. 2), a pair of tubes 44 which are attached to a pair of the ends of a T-connection 45, are positioned about the fluid carrying members 43, with the third end of the T-connection 45 being connected through a tube 50 to a three-way valve 52 mounted on the fluid reservoir 21. A flexible tube 56 supplies the three-way valve 52 with fluid from the reservoir 21 and a flexible tube 53 connects the valve 52 and the pump 19 which is operated by depressing a foot operated plunger 54, which projects upwardly from the floorboard 17.

In the operation of the windshield clearing system, on actuation of the foot operated plunger 54 fluid under pressure is forced through the flexible tube 53 and into the three-way valve 52 which is opened by the fluid pressure to admit fluid through the flexible tubes 50 and 44 to the fluid carrying members 43 concurrently with the closing of the tube 56 to the reservoir 21. Fluid under pressure from the fluid carrying members 43 is then discharged from the discharge orifices 39 in the ball members 27 as jets of fluid directed against the windshield 11. When the plunger 54 is released, fluid is drawn from the reservoir 21 into the pump 19. In other words, fluid is discharged from the discharge orifices 39 when the plunger 54 is depressed and drawn into the pump 19, for subsequent discharge, when the plunger 54 is released.

From the above description it is seen that a compact nozzle unit 22 has been provided which is attachable directly to the engine cowl of an automobile. Each nozzle unit 22 is readily adjustable to direct a stream of fluid onto the desired portion of the windshield 11 by merely inserting a pin or the like in the fluid passage 39 in the ball member 27 and moving the ball member 27 against the frictional force exerted thereon by the tubular sleeve member 26.

Although the invention has been described with respect to a preferred embodiment thereof, it is to be understood that it is not to be so limited since changes can be made therein which are within the full intended scope of this invention as defined by the appended claims.

I claim:

1. A discharge nozzle comprising an upright head member having a fluid passage extended therethrough, said passage terminating at one of its ends in an inclined outlet portion, a tubular member positioned within said outlet portion at a position such that the outer end of said tubular member is substantially flush with said head member, a ball member of a diameter substantially equal to the inner diameter of said tubular member and disposed within said tubular member, said tubular member being shaped at its inner end so as to form a seat for said ball member, said seat being positioned from the outer end of said tubular member a distance greater than the radius but less than the diameter of said ball member so that said ball member projects from the open outer end of said tubular member, when the ball member is against said seat, the edges of the side wall of said outer end of said tubular member being in engagement with said ball member to frictionally retain said ball member on said seat, and said ball member having an opening extended therethrough in communication with said passage.

2. A discharge nozzle comprising a head member having a fluid passage extended therethrough, said passage having a pair of ends, with one of said ends terminating in the outer surface of said head member and constituting an outlet, a ball and seat assembly disposed within the outlet end of said fluid passage and including a tubular member having an inner end and an outer end, with the inner end of said tubular member being shaped so as to form a seat and with the outer end of said tubular member being positioned substantially flush with said outer surface of the head member, a ball member disposed within said tubular member and positioned on said seat, said tubular member being of a length such that said seat is positioned from the outlet end of said tubular member a distance less than the diameter but greater than the radius of said ball member so that said ball member projects beyond the outer end of said tubular member, with the outer end of said tubular member being in engagement with said ball member to frictionally retain the ball member on said seat, said assembly being disposed in said fluid passage so that the outer end of said tubular member is adjacent the outer surface of said head member.

References Cited in the file of this patent

UNITED STATES PATENTS

| 1,636,903 | Dodge | July 26, 1927 |
| 2,289,650 | Horton | July 14, 1942 |

FOREIGN PATENTS

| 360,104 | Great Britain | Nov. 5, 1931 |
| 671,293 | Great Britain | Apr. 30, 1952 |